United States Patent [19]

Liu et al.

[11] 4,358,316

[45] Nov. 9, 1982

[54] ALLOYS FOR HYDROGEN STORAGE

[75] Inventors: James Liu, Ramsey, N.J.; Charles E. Lundin, deceased, late of Evergreen, Colo., by Bonnie R. Lundin, legal representative

[73] Assignee: University Patents, Inc., Norwalk, Conn.

[21] Appl. No.: 220,596

[22] Filed: Dec. 29, 1980

[51] Int. Cl.$^3$ .......................... C22C 30/00; C01B 6/02
[52] U.S. Cl. .............................. 75/123 N; 75/123 M; 420/417; 420/581; 420/900; 423/644
[58] Field of Search ............ 75/134 F, 134 M, 134 N, 75/122, 123 N, 123 M; 62/48; 34/15; 423/644

[56] References Cited

U.S. PATENT DOCUMENTS 3,922,872 12/1975 Reilly et al. ........................ 62/48
4,111,689 9/1978 Liu ...................................... 75/122
4,161,211 7/1979 Duffy et al. ........................ 165/1
4,278,466 7/1981 de Pous ............................ 75/175.5
4,283,226 8/1981 van Mal et al. ................. 75/175.5

OTHER PUBLICATIONS

Reilly et al., "Hydrogen Storage and Purification System II", BNL-19436 Aug. 1974.

Primary Examiner—M. J. Andrews
Assistant Examiner—Christopher W. Brody
Attorney, Agent, or Firm—Jerome M. Teplitz; A. Sidney Alpert; David N. Koffsky

[57] ABSTRACT

An alloy capable of reversible sorption of hydrogen having the formula $Fe_{1-x}Mn_xTi_{1-y}V_y$, where x is within the range from 0 to 0.2 and y is within the range of from 0.005 to 0.08.

7 Claims, 2 Drawing Figures

ALLOYS FOR HYDROGEN STORAGE

BACKGROUND OF THE INVENTION

The present invention relates to the storage of hydrogen and, more particularly, to novel alloys capable of reversible sorption of hydrogen.

Hydrogenn gas has been considered as an alternate fuel for various types of power sources, such as internal combustion engines, gas turbines, fuel cells, and the like. Its attractiveness as a fuel stems from the fact that it can be produced using various essentially inexhaustible energy sources, i.e., solar, nuclear, and geothermal; and that it is essentially nonpolluting. One of the primary problems relating to the use of hydrogen as a fuel is in regard to its storage over extended periods of time. Conventional storage methods, such as compression and liquefaction in pressure vessels, are not satisfactory due to the danger of fire and explosion.

A promising approach to the problem of hydrogen storage lies in the use of metal alloys which are capable of reversible sorption of hydrogen. A number of metal alloys have previously been proposed for the solid state storage of hydrogen in the form of metal hydrides. Among such metal alloys disclosed in the prior art are iron-titanium alloys (Wiswall, Jr., et al., U.S. Pat. Nos. 3,508,414 and 3,516,263), and modifications thereof with manganese (Reilly, et al., U.S. Pat. No. 3,922,872) and/or vanadium (Liu, U.S. Pat. No. 4,111,689). The modification with manganese is taught by the Reilly, et al. patent to increase the hydrogen storage capacity of the alloy and to reduce the dissociation pressure of the metal hydride. The vanadium-containing alloys disclosed in the Liu patent have a vanadium content ranging from about 5 to 33 percent by weight, and are taught to eliminate the necessity for elevated temperatures during the hydrogen sorption operation.

One of the problems associated with all of the above-described prior art iron-titanium-based alloys is the inability of their hydrides to release substantially all of the desorbable hydrogen at a substantially constant pressure at a given temperature. This hydrogen storage characteristic of the metal alloy may be readily determined by examining the desorption isotherm of the metal hydride, which is obtained by plotting the dissociation pressure of the hydride at a constant temperature against its H/M ratio, which is defined as the ratio of total hydrogen atoms to total metal atoms in the hydride. For practical use as a hydrogen fuel source, the metal hydride should ideally exhibit a room temperature desorption isotherm having a long, flat plateau somewhere between 1 to 10 atmospheres and extending over substantially the entire range of H/M ratios. The desorption isotherms of the metal hydrides of all of the above-described prior art iron-titanium-based alloys, at best, exhibit two distinct plateaus, one considerably higher than the other, indicating a substantial variation in the hydrogen release pressure at a given temperature as the hydrogen content of the metal hydride becomes diminished.

SUMMARY OF THE INVENTION

It is, accordingly, a primary object of the present invention to provide an improved metal alloy for use in the storge of hydrogen which, under constant temperature conditions, is capable of releasing sorbed hydrogen therefrom at a pressure which remains substantially constant with diminishing sorbed hydrogen content until substantially all of the usable hydrogen has been released.

Another object of the invention is to provide an improved metal alloy in accordance with the preceding object, which is capable of releasing sorbed hydrogen therefrom at or near room temperature at a dissociation pressure within the range of from about 1 to about 10 atmospheres.

A further object of the invention is to provide a family of metal alloys in accordance with the preceding object, whose composition can be varied to enable adjustment of such room temperature dissociation pressure to various values within such range.

The above and other objects are achieved in accordance with the present invention by providing an alloy having the formula $Fe_{1-x}Mn_xTi_{1-y}V_y$, wherein x is within the range of from 0 to 0.2 and y is within the range of, broadly, from 0.005 to 0.08, and more preferably, from 0.005 to 0.06. Such alloys are capable of reversible sorption of hydrogen and are thus useful for the storage of hydrogen. It has unexpectedly been discovered that alloys of the above formula are capable, under constant temperature conditions, of releasing sorbed hydrogen therefrom at a pressure which remains substantially constant with diminishing sorbed hydrogen content until substantially all of the usable hydrogen has been released. The alloys of the present invention are furthermore capable of releasing sorbed hydrogen therefrom at or near room temperature at a dissociation pressure within the range of from about 1 to about 10 atmospheres. Moreover, it is possible with the alloys of the present invention to adjust such room temperature dissociation pressure to various values within such range merely by varying the relative manganese and vanadium contents of the alloys within the ranges specified in the formula. These properties render the alloys of the present invention particularly suitable for the storage and release of hydrogen for use as a fuel in automobile applications.

DESCRIPTION OF PREFERRED EMBODIMENTS

Figure 2:
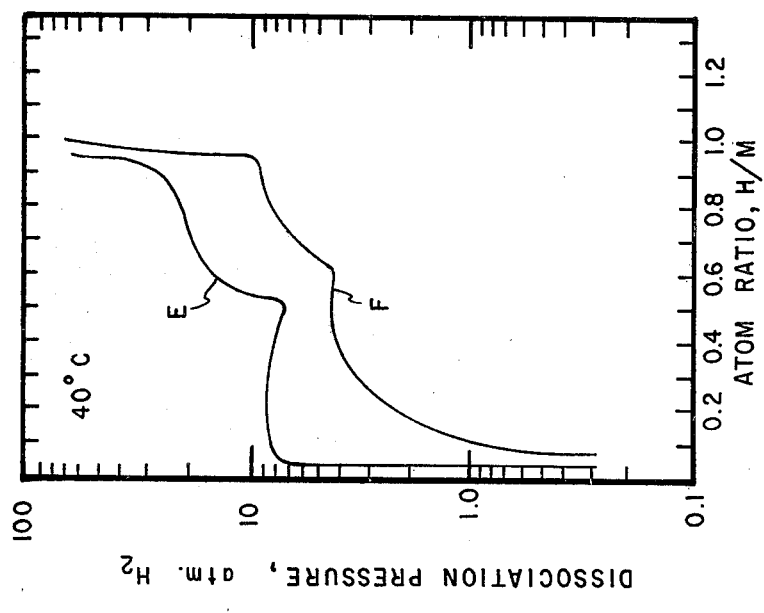
FIG. 2 shows, for purposes of comparison, hydrogen desorption isotherms at 40° C., illustrating the hydrogen storage characteristics of two iron-titantium-based alloys of the prior art.

The alloys used for storing hydrogen in accordance with the present invention can be produced by standard alloying procedures. They can be formed by mixing together the proper amounts of granules or small ingots of titanium, vanadium, and iron; or titanium, vanadium, iron, and manganese; and melting the mixture in an arc or induction furnace within an inert atmosphere, followed by cooling the melt.

Several of the alloys of the present invention, when prepared in the above manner, may have a tendency to be formed with a cored microstructure due to rapid cooling rates from their melts. Such cored microstructure will tend to have a distorting effect upon the characteristic flat shape of the desorption isotherms of the resulting metal hydride. In order to eliminate any such cored microstructure, and hence ensure a desorption isotherm having the desired long, flat plateau, the alloys, prior to hydride formation, are advantageously subjected to a homogenation heat treatment. Such homogenation heat treatment may be suitably carried out, for example, by holding the alloy under an inert atmosphere of argon at a temperature of about 1075° C. for about 24 hours.

In utilizing the alloys of the present invention for the storage of hydrogen, the alloy in chunks or powder form is introduced into a stainless steel reactor and degassed by evacuating the reactor. Gaseous hydrogen is then introduced into the reactor at a temperature varying from room temperature to about $-10°$ C. or lower, at a hydrogen pressure sufficiently higher than the dissociation pressure of the resulting hydride for the contacting temperature employed, so as to overcome the hysteresis-type effects. For example, with the alloys of the present invention, such hysteresis will typically amount to a value within the range of from about 1 to about 5 atmospheres. The reaction between hydrogen and the alloys of the present invention is exothermic, so that no heat is required during the sorbing operation. While the reaction can be carried out at elevated temperatures, the amount of hydrogen sorbed will be correspondingly decreased. The exothermic reaction between hydrogen gas and the alloy begins immediately, and it is frequently necessary to remove heat in order for the reaction to proceed to completion.

The metal hydrides formed with the alloys of the present invention have room temperature dissociation pressures within the range of from about 1 to about 10 atmospheres, depending upon their relative manganese and vanadium contents. As a general rule, the dissociation pressure of the hydride will be decreased with increasing manganese content and decreasing vanadium content of the alloy, and vice versa. Thus, by proper selection of the manganese and vanadium contents of the alloy employed within the ranges specified in the formula set forth above, the room temperature dissociation pressure can be adjusted to the desired value. For example, the metal hydride formed from the alloy having the formula $Fe_{0.8}Mn_{0.2}Ti_{0.98}V_{0.02}$ has a room temperature dissociation pressure of about 2 atmospheres; the metal hydride formed from the alloy having the formula $Fe_{0.9}Mn_{0.1}Ti_{0.98}V_{0.02}$ has a room temperature dissociation pressure of about 3 atmospheres; and the metal hydride formed from the alloy having the formula $Fe_{1.0}Ti_{0.96}V_{0.04}$ has a room temperature dissociation pressure of about 5 atmospheres. The alloys which are most preferred in accordance with the present invention are those having the formula $Fe_{1-x}Mn_xTi_{1-y}V_y$, where x is within the range of from 0 to 0.2 and y is within the range of from 0.01 to 0.04.

The metal hydrides formed from the alloys of the present invention can be stored in a pressure vessel at room temperature and moderate hydrogen pressures above their dissociation pressure until time for release of the hydrogen for use. During such storage period, care should be exercised to avoid having the metal hydride exposed to air, since oxygen contamination results in the hydride losing its recyclability. Should the metal hydride become accidently exposed to air, it may be reactivated by evacuation of its containment vessel at a temperature of about 70° C.

When ready for use, the hydrogen can be released from the metal hydride at ambient temperatures merely by allowing the hydrogen to escape from the vessel in which it is contained.

The metal hydrides formed from the alloys of the present invention exhibit room temperature desorption isotherms having a long, flat plateau extending over substantially the entire range of H/M ratios, with plateau pressures ranging from about 1 to about 5 atmospheres, depending upon the relative manganese and vanadium contents. This indicates that under constant temperature conditions, the metal hydrides are capable of releasing sorbed hydrogen therefrom at a pressure which remains substantially constant with diminishing sorbed hydrogen content until substantially all of the usable hydrogen has been released.

The invention is further illustrated by way of the following examples.

EXAMPLE 1

A 25-gram alloy button was prepared from a charging material containing 10.7786 grams of iron, 2.6508 grams of manganese, 11.3249 grams of titanium, and 0.2458 gram of vanadium. The charging material was loaded in a water-cooled, pure copper crucible which was located inside an arc furnace. The furnace was then evacuated to a vacuum of better than $10^{-3}$ torr, and then flushed several times with pure argon. The furnace was then refilled with argon, and the charging material was heated to above its melting temperature and thereafter cooled down therefrom. The melting and cooling cycle was repeated three more times, with the button-shaped alloy specimen being flipped over between each successive cycle. Thereafter, the alloy button was subjected to a homogenation heat treatment by maintaining it under an inert atmosphere of argon at a temperature of 1075° C. for 24 hours.

The resulting alloy button had a composition corresponding to the formula $Fe_{0.8}Mn_{0.2}Ti_{0.98}V_{0.02}$ (alloy A).

EXAMPLE 2

The procedure of Example 1 was repeated, employing a charging material containing 12.1188 grams of iron, 1.3246 grams of manganese, 11.4337 grams of titanium, and 0.1228 gram of vanadium. The homogenation heat treatment step was omitted. The resulting alloy button had a composition corresponding to the formula $Fe_{0.9}Mn_{0.1}Ti_{0.99}V_{0.01}$ (alloy B).

EXAMPLE 3

The procedure of Example 1 was repeated, with a charging material containing 12.1153 grams of iron, 1.3242 grams of manganese, 11.3149 grams of titanium, and 0.2456 gram of vanadium. The resulting alloy button had a composition corresponding to the formula $Fe_{0.9}Mn_{0.1}Ti_{0.98}V_{0.02}$ (alloy C).

EXAMPLE 4

The procedure of Example 1 was repeated, with a charging material containing 13.4417 grams of iron, 11.0678 grams of titanium, and 0.4905 gram of vanadium. The homogenation heat treatment step was omitted. The resulting alloy button had a composition corresponding to the formula $Fe_{1.0}Ti_{0.96}V_{0.04}$ (alloy D).

EXAMPLE 5

Each of the four alloys A,B,C, and D, as prepared in Examples 1–4, respectively, was tested for its hydrogen sorption and desorption characteristics, in the following manner. An approximately 5-gram sample of the alloy was crushed to a particle size of −20 mesh and loaded into a stainless steel reactor located inside a 25° C. temperature-controlled container. The reactor was attached to a modified, high pressure stainless steel Sievert's Apparatus, each volumn section of which was carefully pre-calibrated. The Apparatus with the alloy sample in the reactor was first evacuated and then filled with hydrogen gas. The hydrogen was then reacted with the sample. By careful measurement of the pressures and temperatures before and after the reaction, the total amount of hydrogen sorbed by the alloy was then calculated. After the alloy was fully hydrided, known amounts of hydrogen gas were incrementally removed from the Apparatus, and the hydrogen pressure at each resulting equilibrium point was measured and recorded. The hydrogen desorption isotherm at 25° C. of the hydrided alloy was then obtained by plotting the dissociation pressure of the hydride against its H/M ratio.

Figure 1:
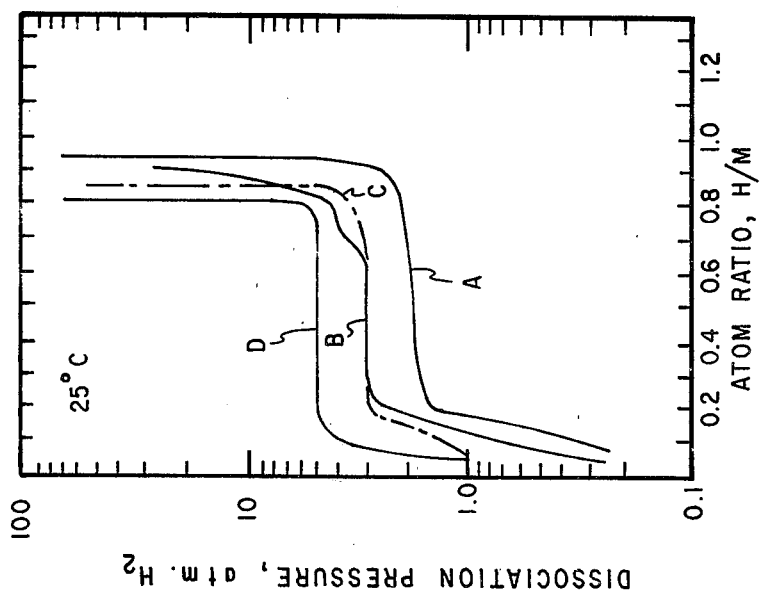
FIG. 1 shows hydrogen desorption isotherms at 25° C., illustrating the hydrogen storage characteristics of four alloys in accordance with the present invention.

The resulting hydrogen desorption isotherms at 25° C., for each of the four alloys tested, are shown in FIG. 1. It will be noted that the desorption isotherms all have a long, flat plateau which, with the exception of the alloy B isotherm, extend over substantially the entire range of H/M ratios, with plateau pressures varying from about 1 to about 5 atmospheres, depending upon the relative manganese and vanadium contents. This indicates that under constant temperature conditions, the metal hydrides are capable of releasing sorbed hydrogen therefrom at a pressure which remains substantially constant with diminishing sorbed hydrogen content until substantially all of the usable hydrogen has been released. The somewhat distorted shape of the isotherm obtained for alloy B was due to the fact that the preparation of this alloy did not include the homogenation heat treatment employed in the preparation of alloys A and C for elimination of the cored microstructure formed by a rapid cooling rate from the melt. In this regard, it will be noted that alloy D did not require such homogenation heat treatment in order for its hydrogen desorption isotherm to have an undistorted shape.

For purposes of comparison, the hydrogen desorption isotherms at 40° C. of two iron-titanium-based alloys of the prior art, i.e., $Fe_{1.0}Ti_{1.0}$ (alloy E) and $Fe_{0.8}Mn_{0.2}Ti_{1.0}$ (alloy F), are shown in FIG. 2. It will be noted that both of these desorption isotherms exhibit two distinct plateaus, one considerably higher than the other, indicating a substantial variation in the hydrogen release pressure at constant temperature conditions as the sorbed hydrogen content of the metal hydride becomes diminished.

The embodiments of the invention in which an exclusive property or privilege is claimed are defined as follows:

1. An alloy capable of reversible sorption of hydrogen having the formula $Fe_{1-x}Mn_xTi_{1-y}V_y$, wherein x is within the range of from 0 to 0.2 and y is within the range of from 0.005 to 0.08.

2. The alloy of claim 1, wherein y is within the range of from 0.005 to 0.06.

3. The alloy of claim 1, wherein y is within the range of from 0.01 to 0.04.

4. The alloy of claim 1, having the formula $Fe_{0.8}Mn_{0.2}Ti_{0.98}V_{0.02}$.

5. The alloy of claim 1, having the formula $Fe_{0.9}Mn_{0.1}Ti_{0.98}V_{0.02}$.

6. The alloy of claim 1, having the formula $Fe_{0.9}Mn_{0.1}Ti_{0.99}V_{0.01}$.

7. The alloy of claim 1, having the formula $Fe_{1.0}Ti_{0.96}V_{0.04}$.

* * * * *